United States Patent [19]

Taylor et al.

[11] Patent Number: 5,597,538

[45] Date of Patent: Jan. 28, 1997

[54] PROCESS TO REMOVE RARE EARTHS FROM SPENT NUCLEAR FUEL

[75] Inventors: Peter Taylor; Roderick J. McEachern, both of Pinawa, Canada

[73] Assignee: Atomic Energy of Canada Limited, Ottawa, Canada

[21] Appl. No.: 444,748

[22] Filed: May 19, 1995

[51] Int. Cl.$^6$ .............................. C01G 56/00; C01G 57/00
[52] U.S. Cl. .................................. 423/3; 423/21.1; 264/5
[58] Field of Search .................................. 264/5; 423/3.4, 423/21.1; 252/643; 75/398

[56] References Cited

U.S. PATENT DOCUMENTS

| | | | |
|---|---|---|---|
| 2,822,260 | 2/1958 | Feder et al. | 75/398 |
| 2,877,109 | 3/1959 | Spedding et al. | 75/398 |
| 2,918,366 | 12/1959 | Buyers et al. | 75/394 |
| 2,990,273 | 6/1961 | Chiotti et al. | 75/394 |
| 3,023,097 | 2/1962 | Burris et al. | 75/397 |
| 4,331,618 | 5/1982 | Hoyt | 264/5 |

FOREIGN PATENT DOCUMENTS 589122  12/1959  Canada.
909481  9/1972  Canada.
1172438  8/1984  Canada.

OTHER PUBLICATIONS

Brand, G. E. and Murbach, E. W., Pyrochemical Reprocessing of $UO_2$ by AIROX Summary Report, NAA–SR–11389, Metals, Ceramics and Materials, pp. 1–66, Atomics International, (1965).

Primary Examiner—Ngoclan Mai
Attorney, Agent, or Firm—Helene D'Iorio

[57] ABSTRACT

The present invention relates to a process for removing rare earth elements (RE) from spent nuclear fuel. The spent nuclear fuel is subjected to an oxidation step at a temperature of between about 200° to about 800° C. and a heating step at a temperature of between about 1000° C. to about 1600° C. The process results in the segregation of the spent fuel into a rare earth-rich fluorite-type phase and a rare earth-poor $U_3O_8$ phase. The RE-rich fluorite type phase is separated from the RE-poor $U_3O_8$ phase by conventional separation techniques such as sieving, air classification, sedimentation and the like.

10 Claims, 17 Drawing Sheets

UO-(RE)-O Portion of the Ternary U-RE-O Phase Diagram for a Typical Rare-Earth Element for the Temperature Range from 1000 to 1500°C. The fields are identified as F = fluorite, O = orthorhombic, and M = mixture.

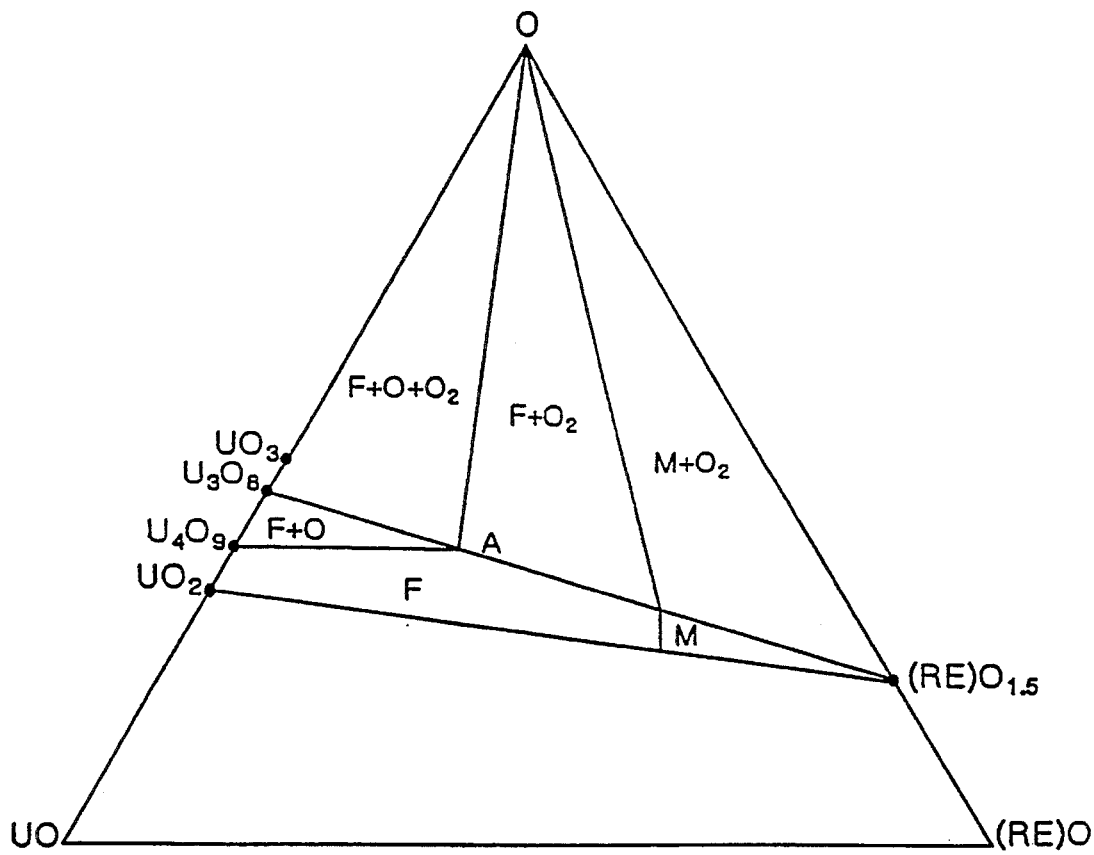
Figure 1: UO-(RE)-O Portion of the Ternary U-RE-O Phase Diagram for a Typical Rare-Earth Element for the Temperature Range from 1000 to 1500°C. The fields are identified as F = fluorite, O = orthorhombic, and M = mixture.

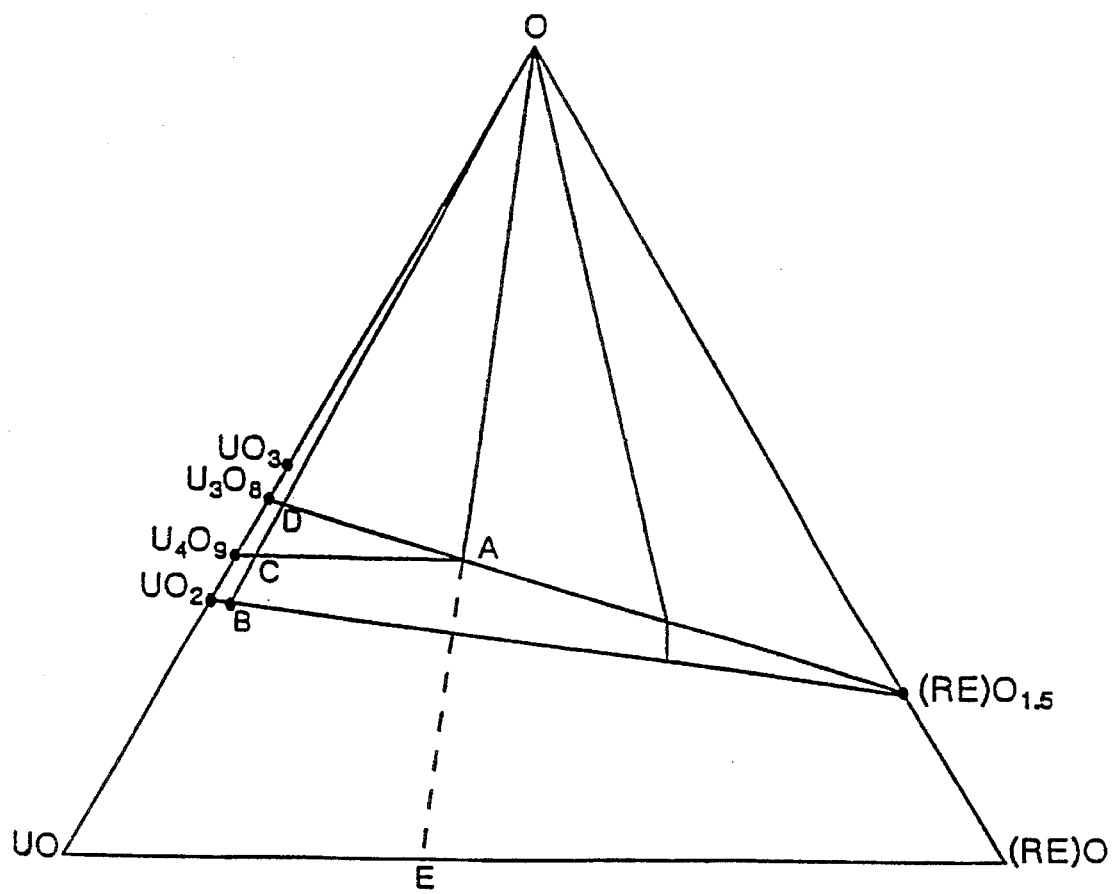
Figure 2: UO-(RE)-O Portion of the Ternary U-RE-O Phase Diagram for the Temperatures from 1000 to 1500°C, Showing the Behavior of a $UO_2$ Sample Doped with 1.7 at.% of a Rare-Earth Element (Equivalent to the RE Content of a Typical Used PWR Fuel).

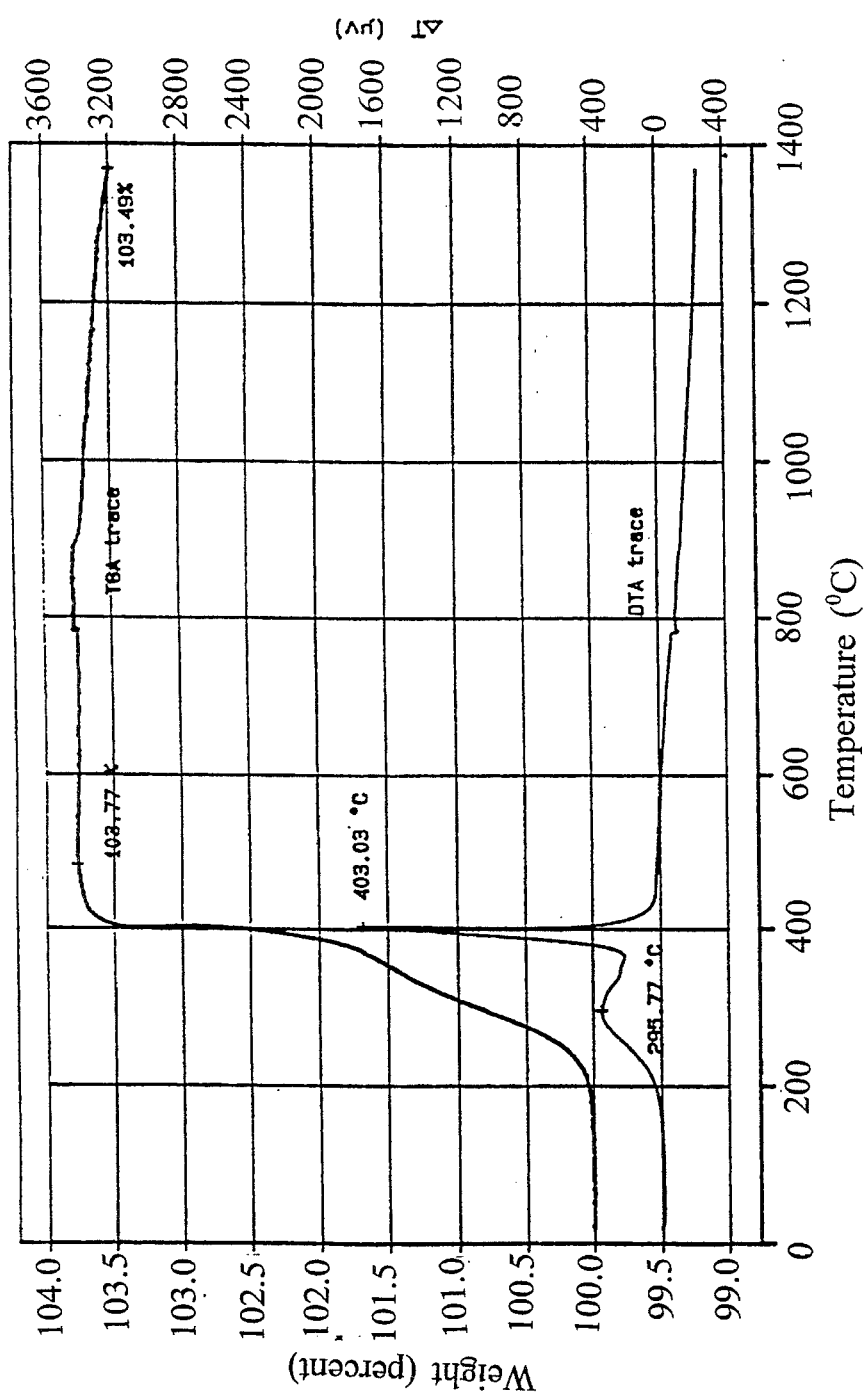
Figure 3: DTA Trace for the Oxidation of UO$_2$ in Air.

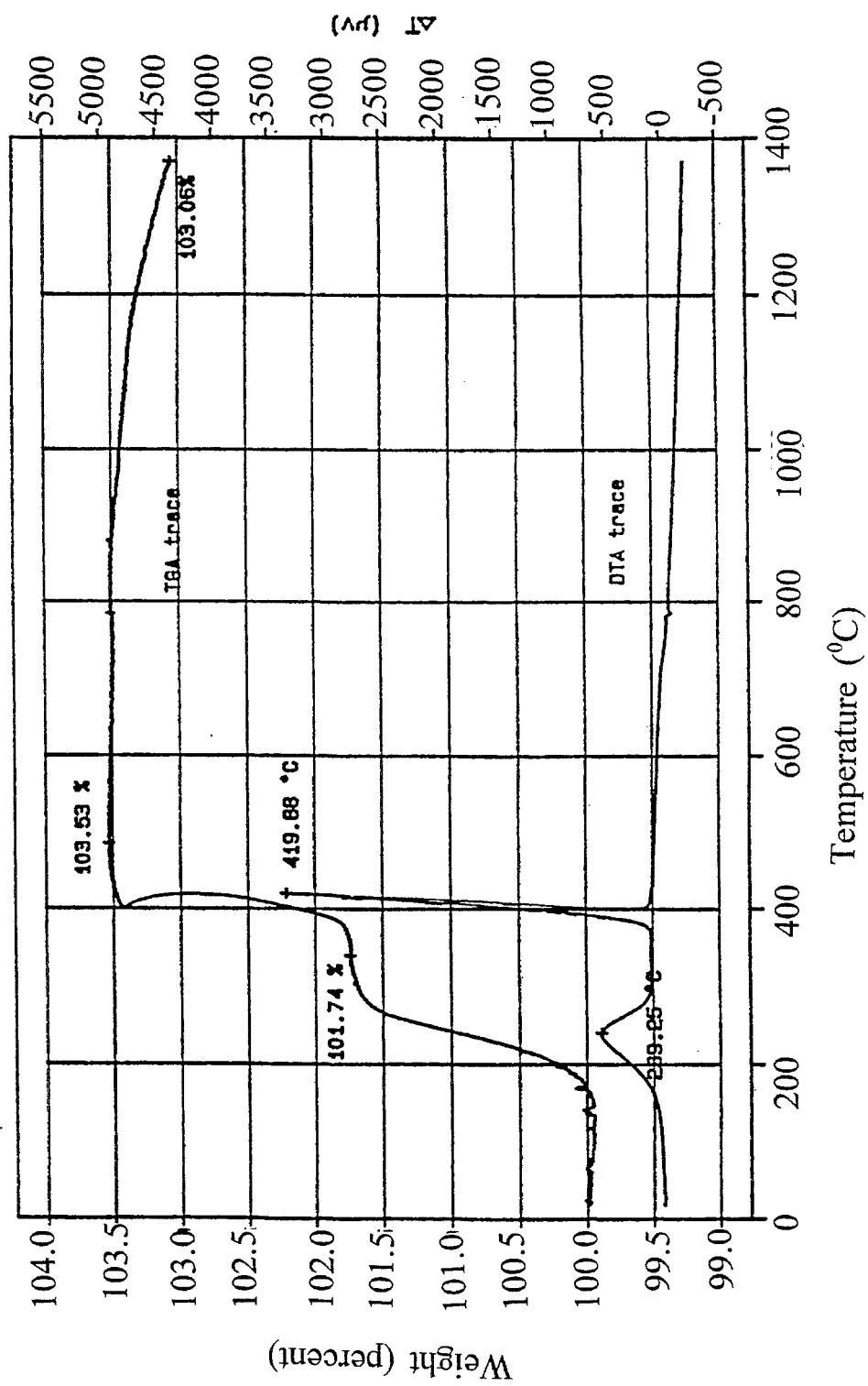
Figure 4: DTA Trace for the Oxidation of 2% Nd-Doped UO$_2$ in Air.

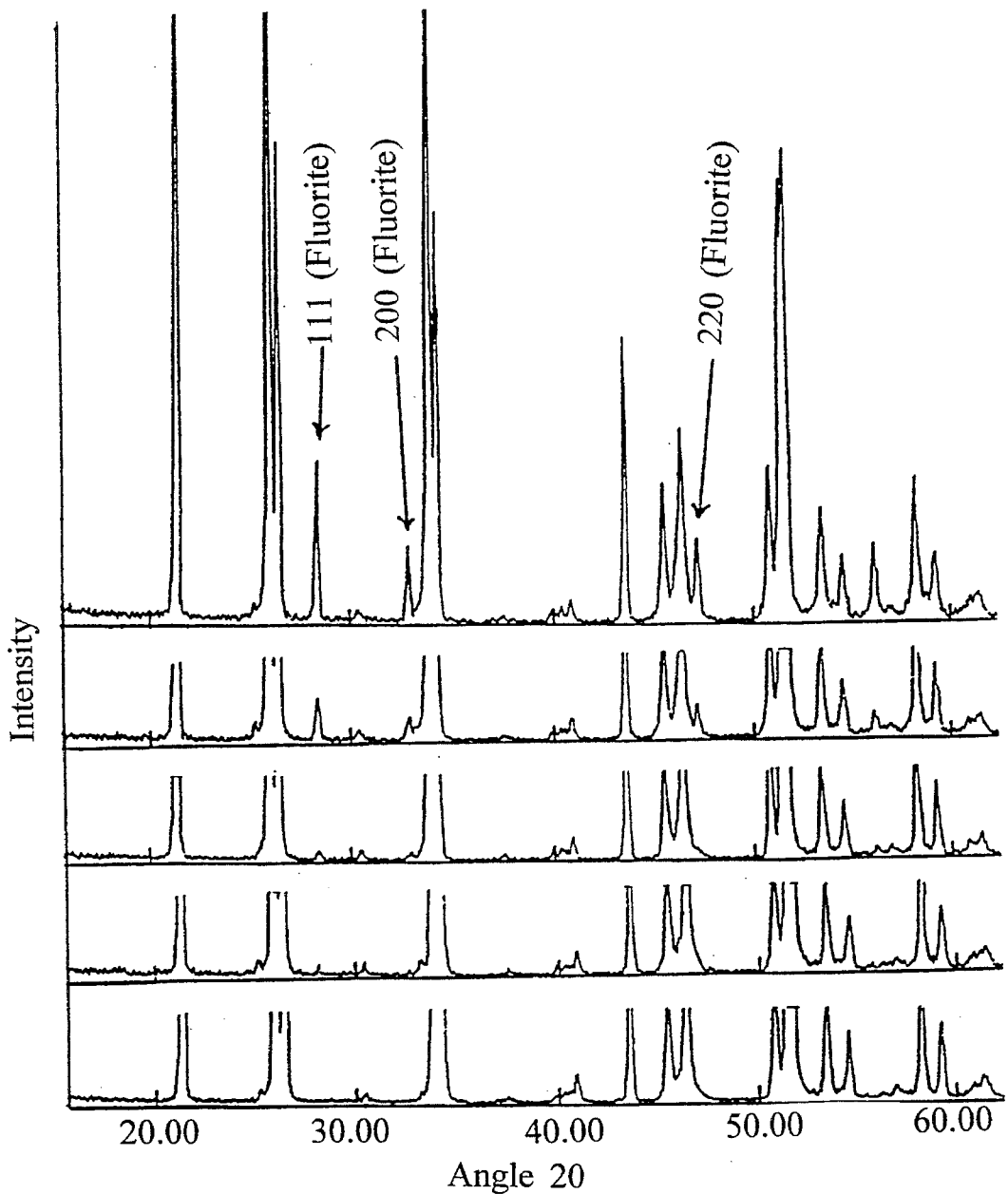

Figure 5: X-Ray Diffraction Pattern for Powders Generated by Subjecting Neodymium-Doped $UO_2$ Powders to a Two-Stage Air Oxidation (580°C, 2 h) and Heat Treatment (1400°C, 1 h). The neodymium content of the powders is 2.0, 1.0, 0.5, 0.1 and 0.0 at.% from the top of the figure to the bottom. The intensities of the peaks at ~28.5, 33 and 47°, associated with the fluorite phase, increase with the neodymium content of the material.

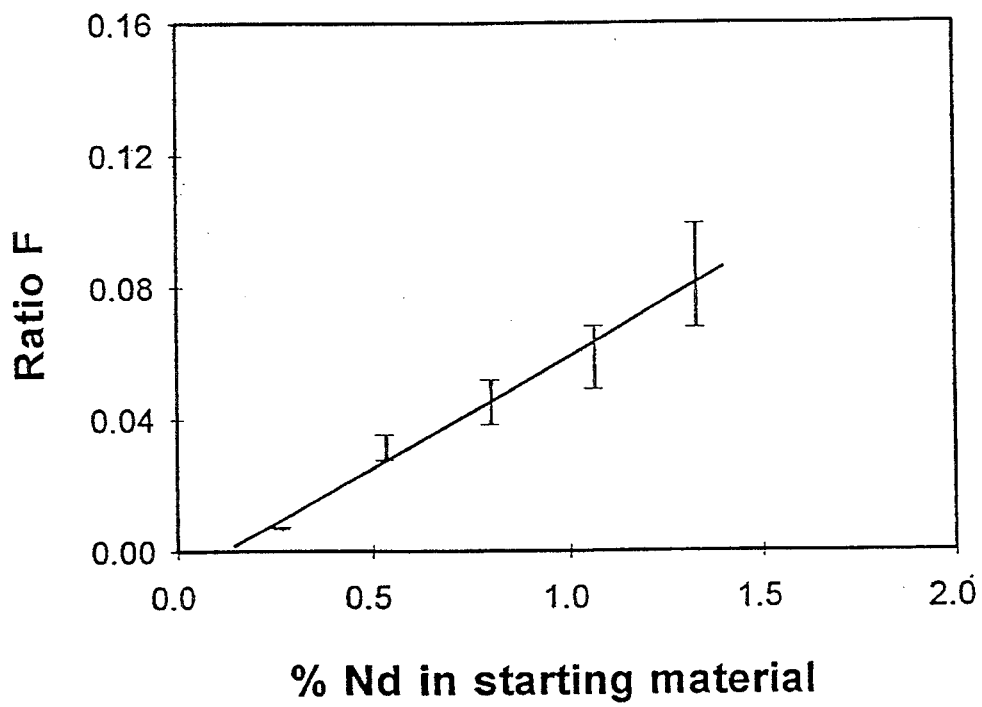
Figure 6: Fraction F of the fluorite-phase material segregated from the $U_3O_8$ versus the at. % Nd for neodymium-doped $UO_2$ oxidized to $U_3O_8$ and then annealed in air for 8 h at 1400°C.

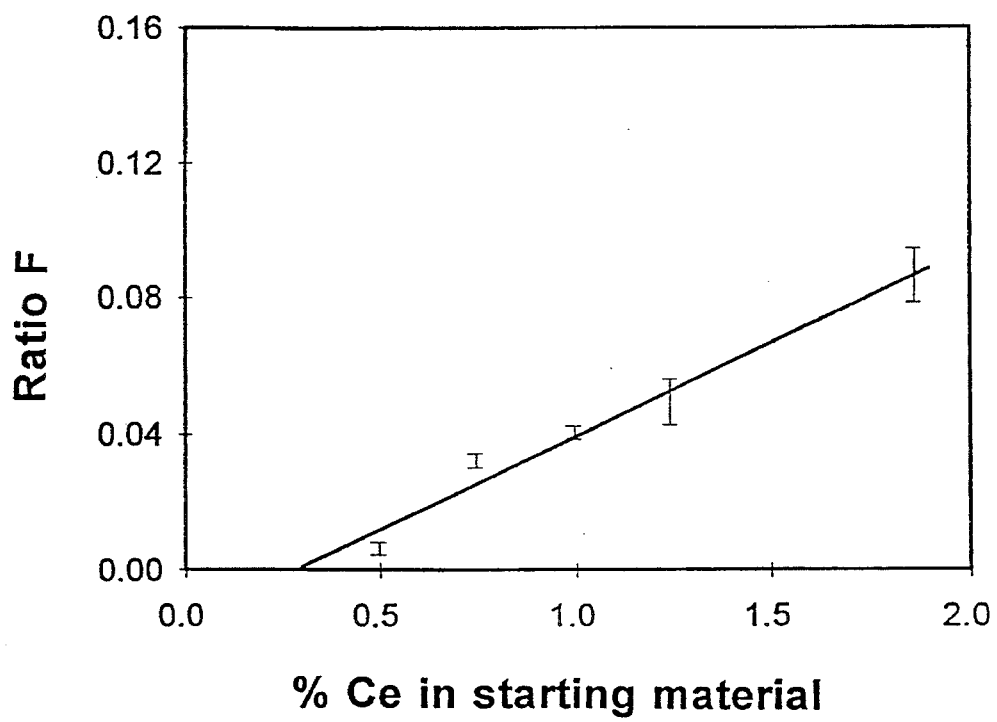
Figure 7: Fraction F of the fluorite-phase material segregated from the $U_3O_8$ versus the at.% Ce for cerium-doped $UO_2$ oxidized to $U_3O_8$ and then annealed in air for 8 h at 1400°C.

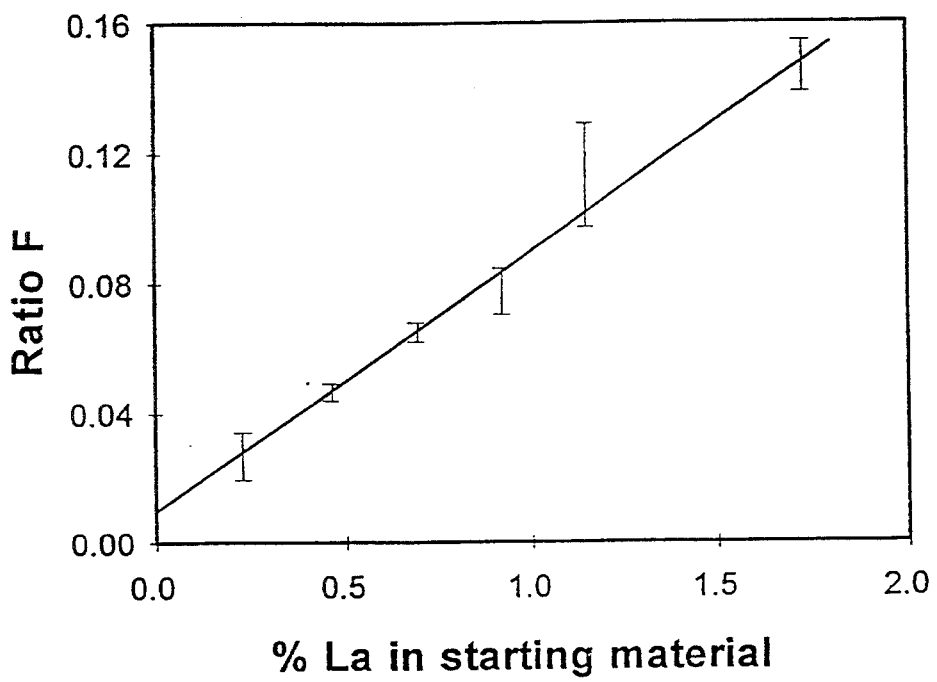
Figure 8: Fraction F of the fluorite-phase material segregated from the $U_3O_8$ versus the at. % La for lanthanum-doped $UO_2$ oxidized to $U_3O_8$ and then annealed in air for 8 h at 1400°C.

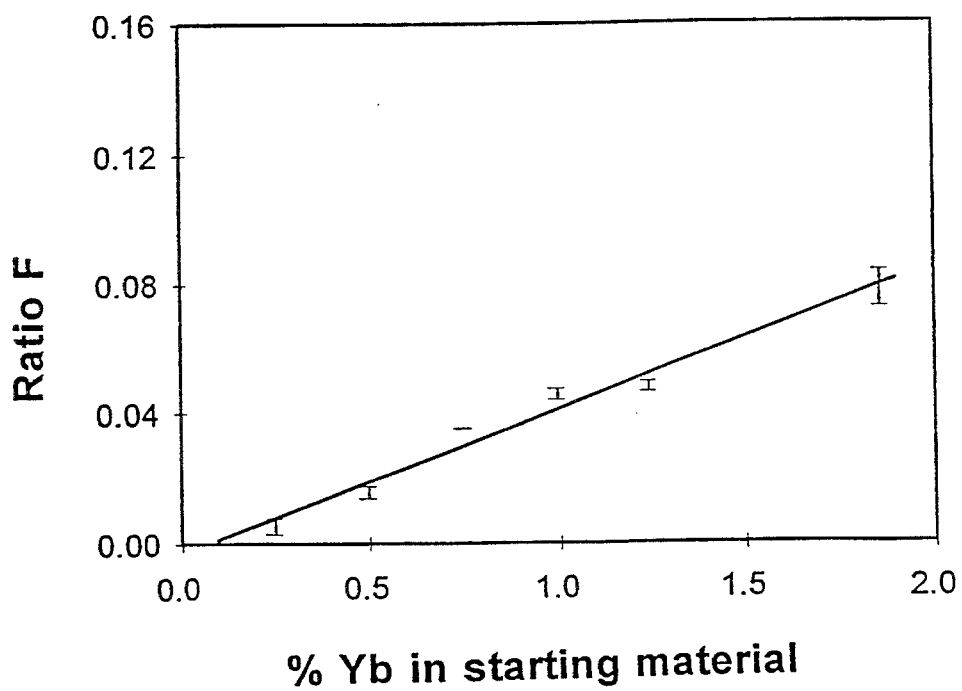
Figure 9: Fraction F of the fluorite-phase material segregated from the $U_3O_8$ versus the at. % Yb for ytterbium-doped $UO_2$ oxidized to $U_3O_8$ and then annealed in air for 8 h at 1400°C.

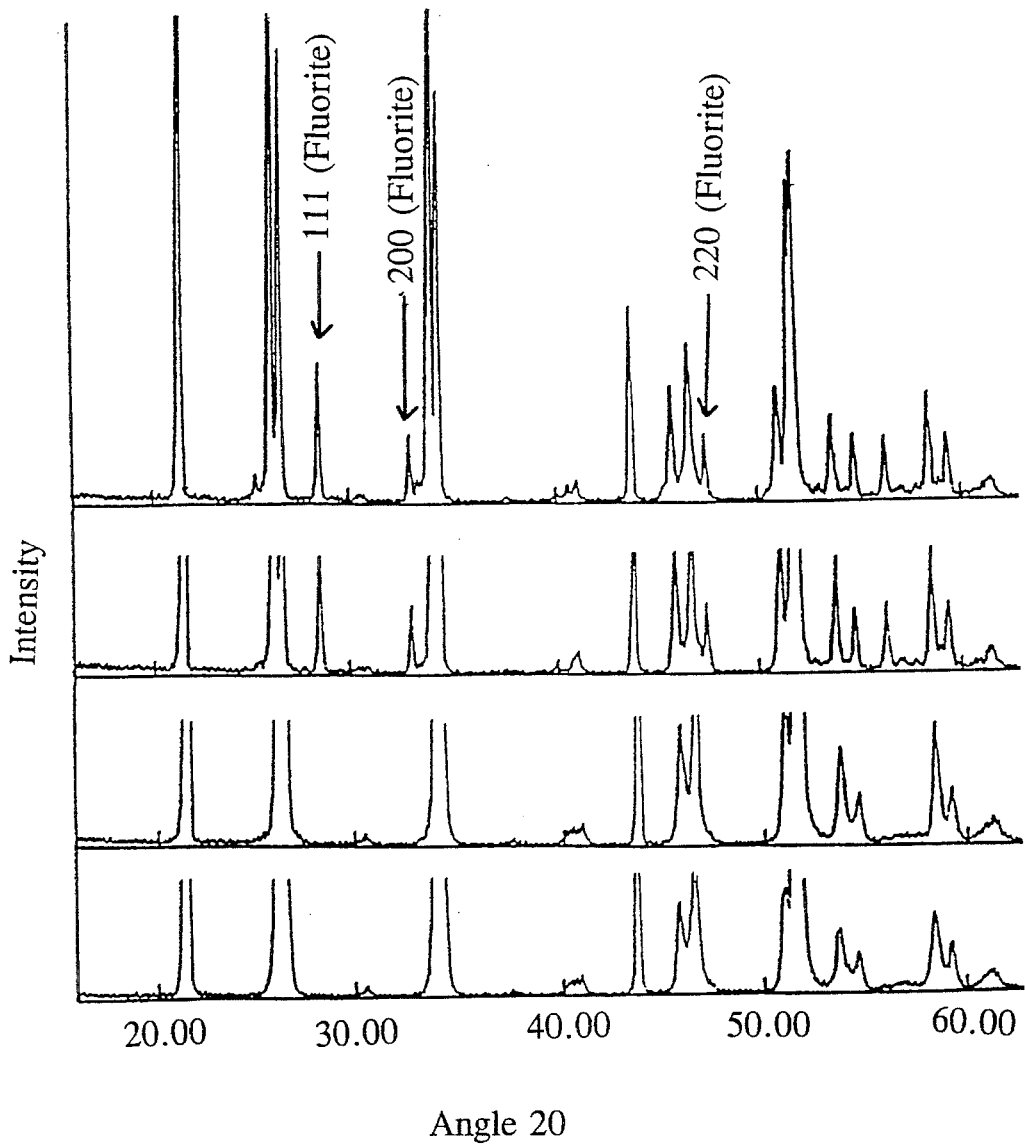

Figure 10: X-Ray Diffraction Patterns for Powders Generated by Oxidizing Neodymium-Doped Sintered Pellets with the process of the present invention. In each case the initial powdering step was at 400°C; the high-temperature segregation stage was performed at 750, 1000, 1250 and 1380° (bottom to top of figure). The peaks at 2θ = 28.5, 33.0 and 47°, associated with the fluorite phase, are present for samples heated to 1250 and 1380° only.

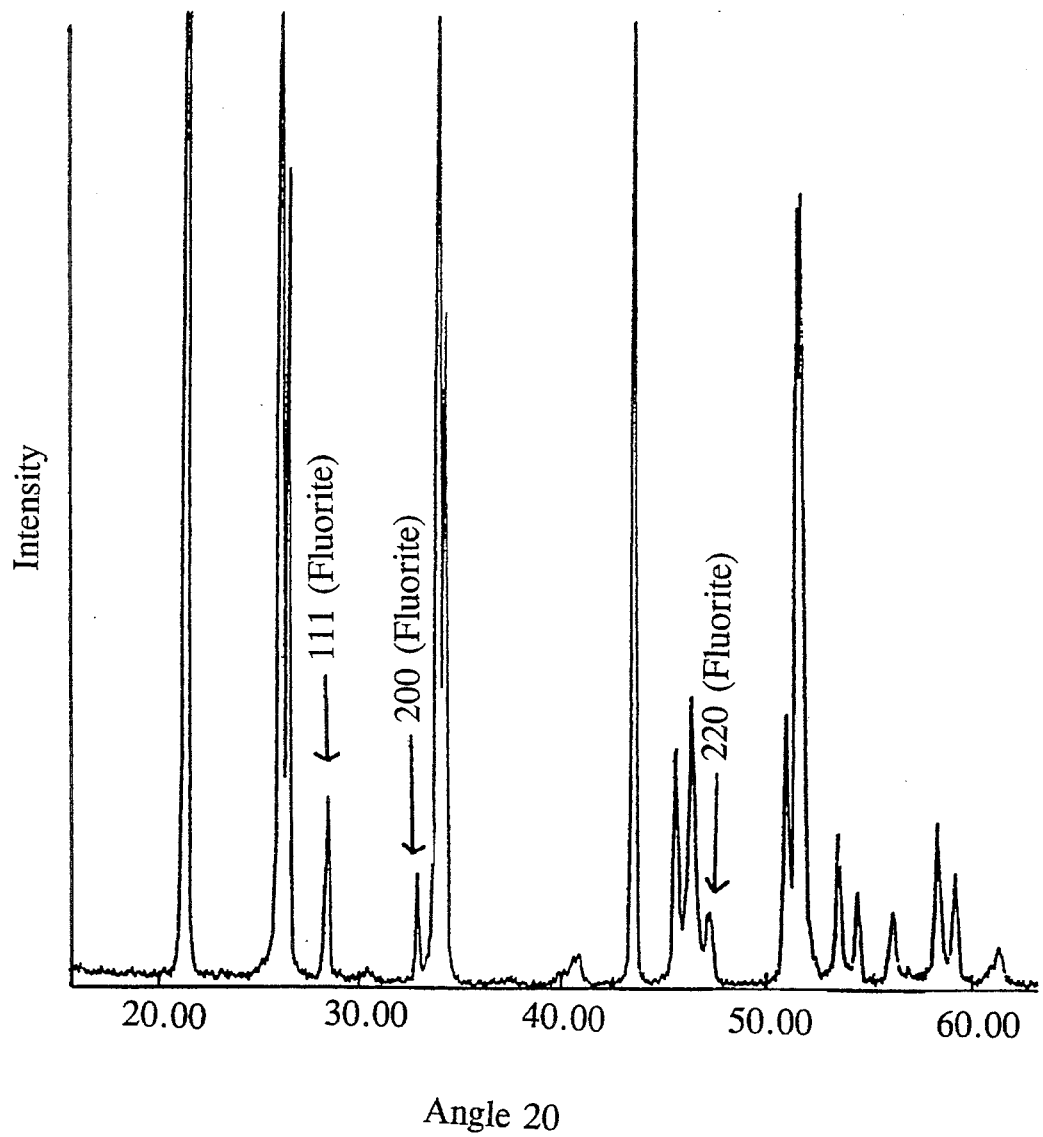
Figure 11: XRD Pattern of the Powder Produced by Treating a Sample of 4% SIMFUEL with the process of the present invention. The sample was powdered by air oxidation at 400°C for 16 h, and then heated in air at 1200°C for a further 16 h. Peaks at 28.5 and 33° are associated with the fluorite phase.

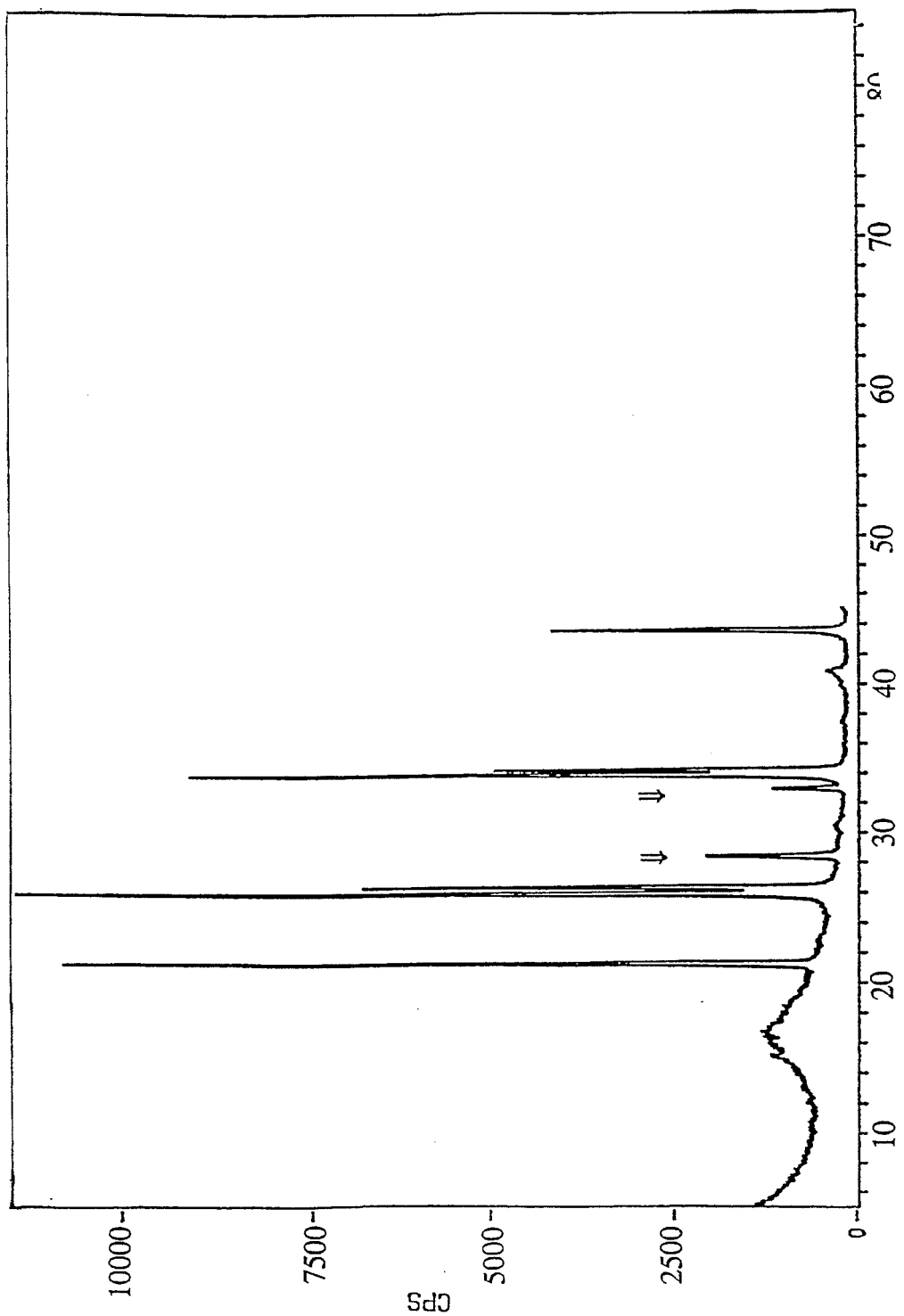
Figure 12(a): XRD Trace for the Oxidation of 2% Nd-Doped UO$_2$ in Air.

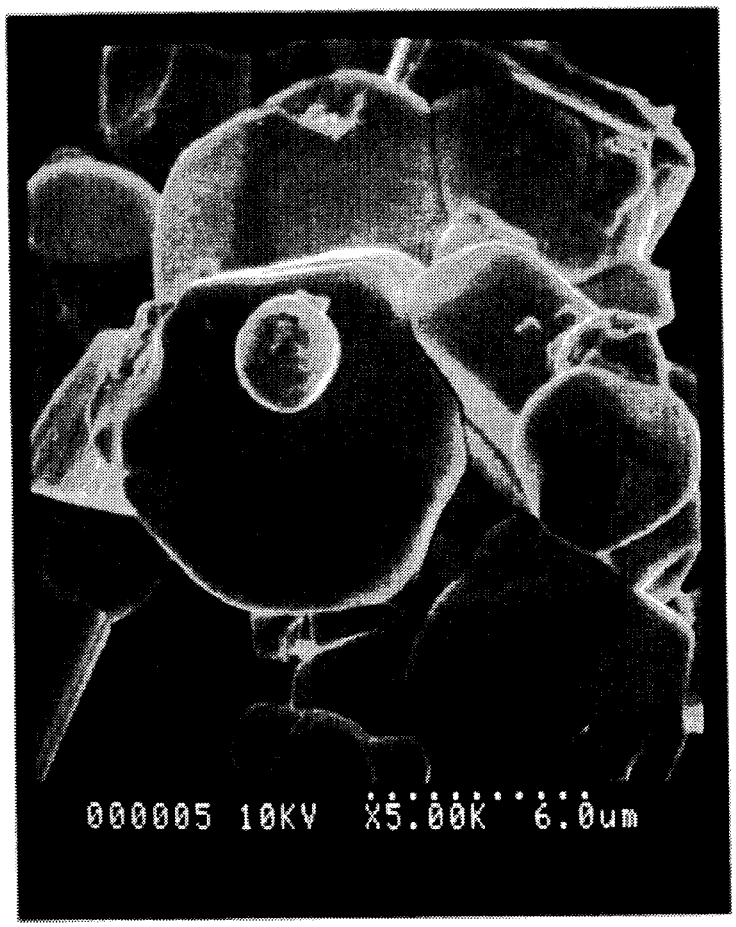
Figure 12(b): SEM Trace for the Oxidation of 2% Nd-Doped $UO_2$ in Air.

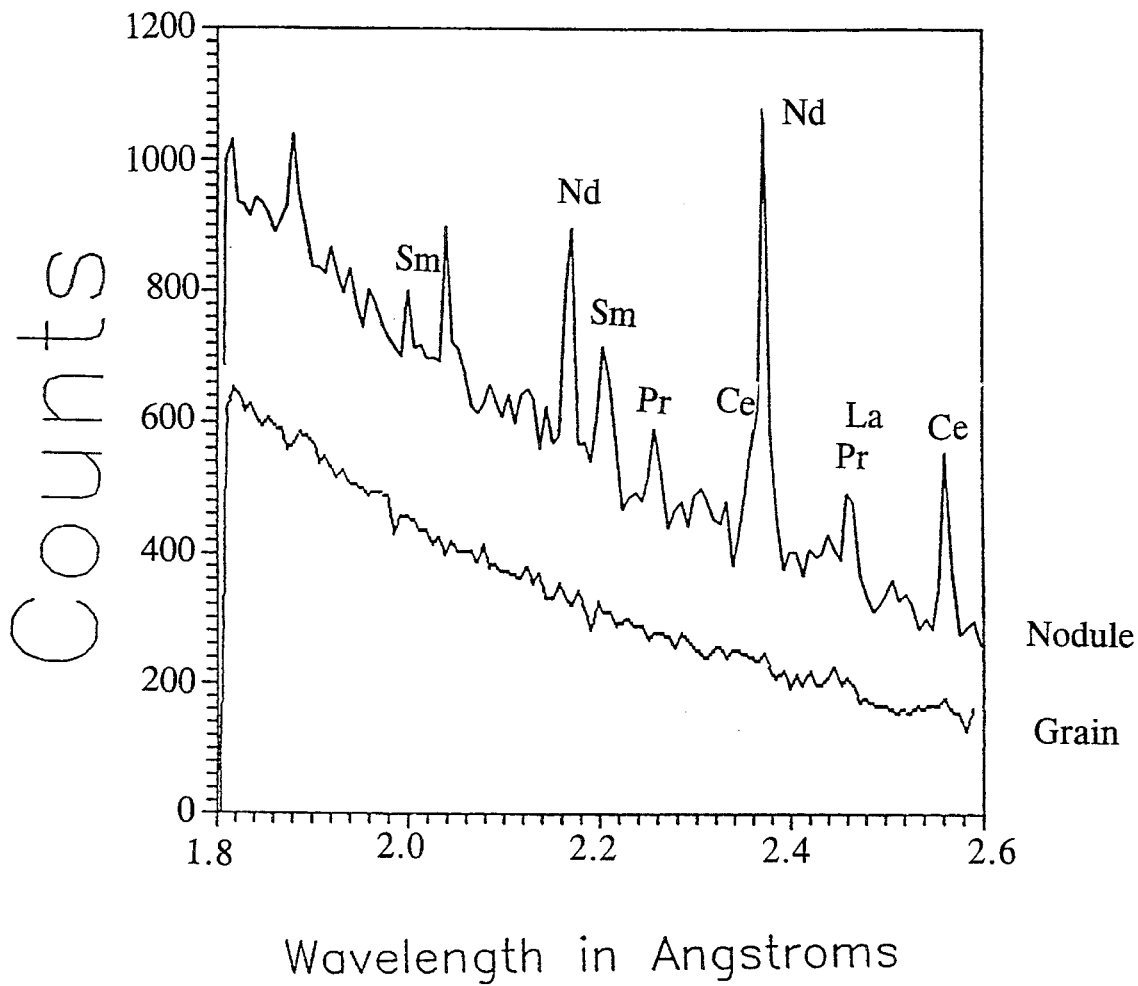
Figure 13: Typical wavelength dispersive X-ray emission (WDX) spectra of $U_3O_8$ grains and rare-earth-rich nodules in a sample obtained by two-stage air oxidation (4.5 h at 440°C) and heat treatment (4 h at 1400°C) of used LWR fuel.

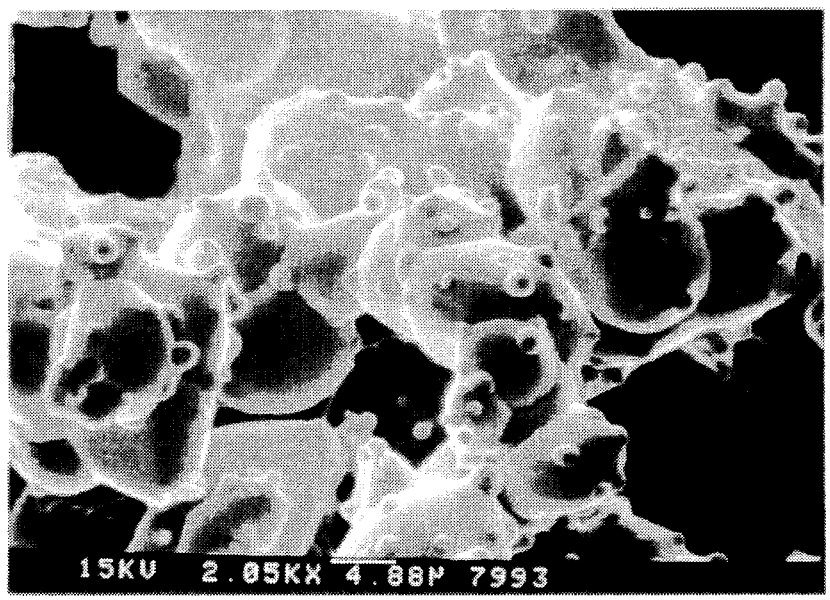
Figure 14: SEM image of a powder produced by oxidizing sintered Nd-doped $UO_2$ at 400°C (16 h) and then heating in air at 1400°C (8 h). The material displays smooth, large (~ 10 μm) $U_3O_8$ grains, and smaller (~ 1 μm) RE-rich nodules.

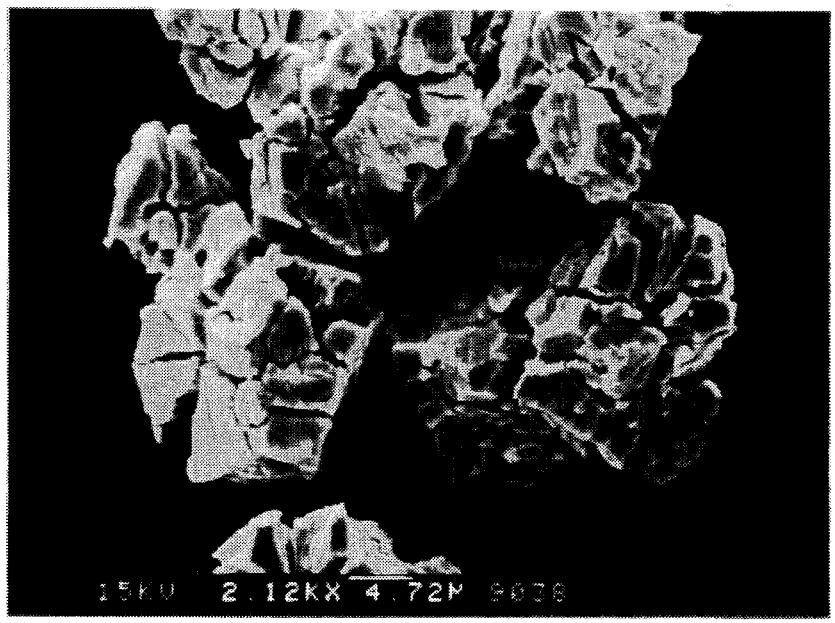
Figure 15: SEM image of a powder produced by oxidizing sintered, Nd-doped $UO_2$ at 400°C (16 h). The $U_3O_8$ particles are irregular in shape, and highly fractured, because the original $UO_2$ grains are ruptured by the 36% volume expansion that occurs upon oxidation. This material shows no sign of further recrystallization of the type illustrated in figure 14.

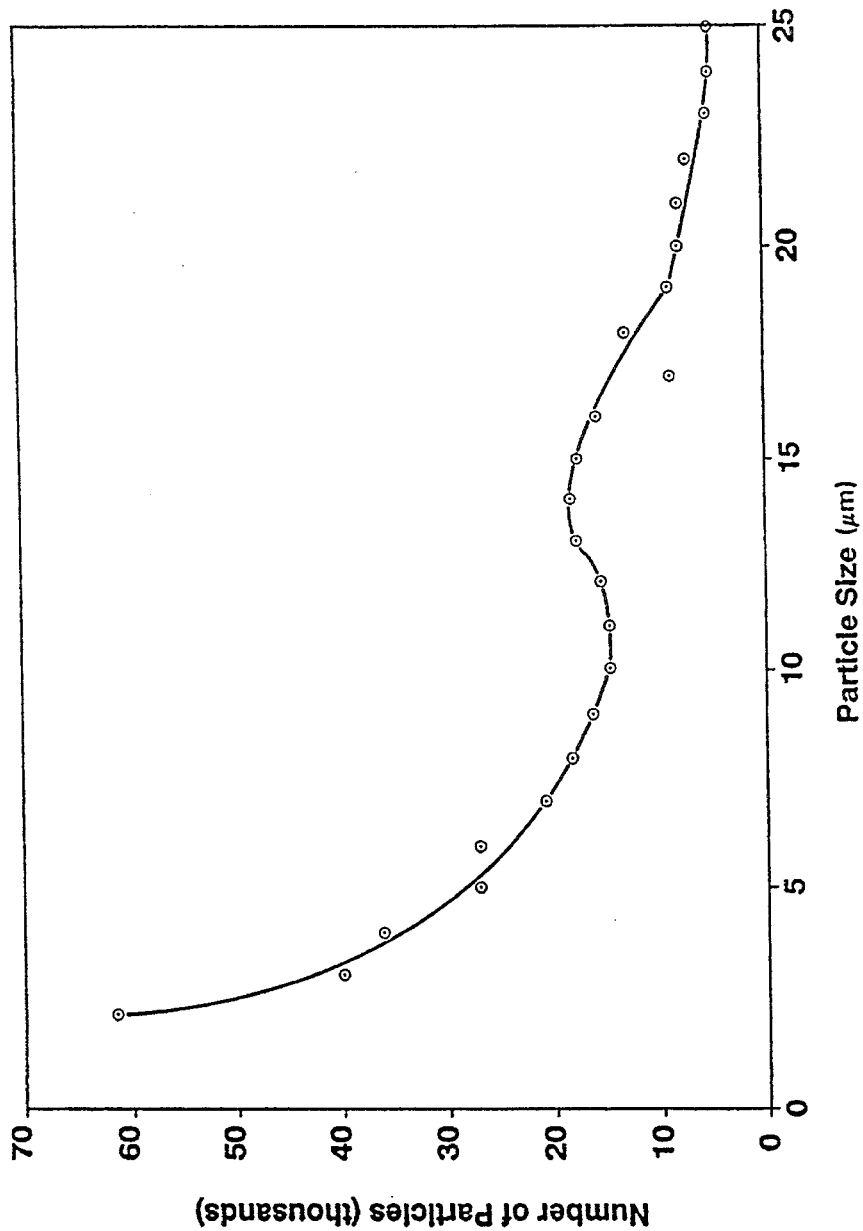
Figure 16: Number of Particles as a Function of Diameter in Neodymium-Doped UO$_2$ After Treatment with the Process of the Present Invention. For clarity, the 380 particles/100cm$^3$ with a diameter of 1 μm or less are not shown in this plot.

PROCESS TO REMOVE RARE EARTHS FROM SPENT NUCLEAR FUEL

FIELD OF THE INVENTION

The present invention relates to a method for removing rare earth elements (for example, neodymium and samarium, which are strong neutron absorbers) from spent nuclear fuel and more particularly, a dry processing technique for so doing.

BACKGROUND OF THE INVENTION

Rare earth (RE) elements (La, Ce, Pr, Nd, Pm, Sm, Eu, Gd, and others) are produced in nuclear fuel by uranium fission and by the decay of other fission products. Many of the rare earths have a large neutron cross section so that they make a large contribution (approximately 50%) to the neutron burden of spent nuclear fuel. When the neutron burden becomes too high, nuclear fuel must be removed from the reactor for disposal. An effective method for removing the RE would allow spent fuel to be reused, and thus provide more energy per kilogram of starting material.

Several dry processing techniques, based on air oxidation and thermal treatment of spent nuclear fuel, are available; none of these effect the removal of any significant amounts of rare earths.

Two of the known dry processing techniques are the AIROX and OREOX processes. In the AIROX process, fuel decladding can be accomplished oxidatively or by conventional mechanical means. In oxidative decladding, the fuel pin is punctured and then heated in air (400° to 600° C.) so that the oxidation of $UO_2$ to $U_3O_8$ causes the cladding to rupture. The resulting $U_3O_8$ powder can then be easily separated from the cladding. The $U_3O_8$ is then reduced in hydrogen at 600° to 1100° C. to regenerate $UO_2$. The oxidation/reduction steps are performed at high enough temperatures to cause the release of volatile fission products. By using oxidation/reduction cycling, the AIROX process can achieve almost complete removal of Xe, Kr, Cs and I.

The OREOX process is an improvement on the AIROX process. Oxidation is performed at a higher temperature (1200° C.) than in the AIROX process resulting in a more effective removal of the volatile fission products.

Wet reprocessing techniques (based on fuel dissolution and subsequent chemical separation) can be used to remove rare earth elements from spent fuel but are not commercially viable because of the large volumes of liquid waste generated and also because of the need to maintain strict plutonium diversion safeguards. For example, Canadian Patent 589,122 discloses a method of reprocessing irradiated nuclear reactor fuel. The patent discloses removal of 99% of some rare earth elements and comprises contacting the uranium in a molten state with a refractory oxide under non-oxidizing conditions and separating the decontaminated uranium from the fission products-containing oxides.

U.S. Pat. No. 2,822,260 discloses a process for the separation of rare earths and other fission product metal values from neutron bombarded uranium. The patent discloses melting uranium with a metal oxide at a temperature from about 1150° to 1400° C. in an inert atmosphere to produce a scale of uranium dioxide on the uranium which is strongly concentrated with most of the fission products.

The present invention relates to a dry processing technique which enables the removal of a significant portion of rare earth elements from irradiated uranium dioxide fuels.

SUMMARY OF THE INVENTION

The invention relates to a method of removing rare earths from spent nuclear fuel. The method comprises the steps of oxidizing the spent nuclear fuel at a temperature of between about 200° to about 800° C. thereby oxidizing $UO_2$ to $U_3O_8$. The spent nuclear fuel is then heated at a temperature of between about 1000° to about 1600° C. thereby causing said $U_3O_8$ to segregate into a RE-rich fluorite phase and RE-poor $U_3O_8$ phase. The RE-rich fluorite phase is then separated from the RE-poor $U_3O_8$ phase.

BRIEF DESCRIPTION OF THE DRAWINGS

FIG. 1 is the UO—(RE)O—O portion of the ternary U—RE—O phase diagram for a typical rare-earth element for a temperature range from 1000° to 1500° C.;

FIG. 2 is the UO—(RE)O—O portion of the ternary U—RE—O phase diagram illustrating the behaviour of a $UO_2$ sample doped with 1.7 mol. % of a rare-earth element;

FIG. 3 is the DTA trace of the oxidation of $UO_2$ in air;

FIG. 4 is the DTA trace for the oxidation of 2% Nd-doped $UO_2$ in air;

FIG. 5 is the X-ray diffraction pattern for powders generated by subjecting neodymium-doped $UO_2$ powders to a two stage air oxidation (580° C., 2 hours) and heat treatment (1400° C., 1 hour);

FIG. 6 depicts Fraction F of the fluorite-phase material segregated from the $U_3O_8$ versus the at. % Nd for neodymium-doped $UO_2$ oxidized to $U_3O_8$ and then annealed in air for 8 h at 1400° C.;

FIG. 7 depicts Fraction F of the fluorite-phase material segregated from the $U_3O_8$ versus the at. % Ce for cerium-doped $UO_2$ oxidized to $U_3O_8$ and then annealed in air for 8 h at 1400° C.;

FIG. 8 depicts Fraction F of the fluorite-phase material segregated from the $U_3O_8$ versus the at. % La for lanthanum-doped $UO_2$ oxidized to $U_3O_8$ and then annealed in air for 8 h at 1400° C.;

FIG. 9 depicts Fraction F of the fluorite-phase material segregated from the $U_3O_8$ versus the at. % Yb for ytterbium-doped $UO_2$ oxidized to $U_3O_8$ and then annealed in air for 8 h at 1400° C.;

FIG. 10 is the X-ray diffraction pattern for powders generated by oxidizing neodymium-doped sintered pellets with the process of the present invention;

FIG. 11 is the XRD pattern of the powder produced by treating a sample of SIMFUEL (4 atom % simulated burnup) with the process of the present invention;

FIG. 12(a) and (b) depict the XRD and SEM patterns respectively for a sample of used H. B. Robinson LWR fuel which was obtained by air oxidation (440° C., 4.5 h) and subsequent heat treatment (1400° C., 4 h). Arrows indicate the position of XRD peaks associated with the fluorite-type phase;

FIG. 13 depicts typical wavelength dispersive X-ray emission (WDX) spectra of $U_3O_8$ grains and rare-earth-rich nodules in a sample obtained by two-stage air oxidation (4.5 h at 440° C.) and heat treatment (4 h at 1400° C.) of used LWR fuel;

FIG. 14 is the SEM image of a powder produced by oxidizing sintered, Nd-doped $UO_2$ at 400° C. (16 hours), then heating in air at 1400° C. (8 hours);

FIG. 15 is the SEM image of a powder produced by oxidizing sintered, Nd-doped $UO_2$ at 400° C. (16 hours); and FIG. 16 depicts the number of particles as a function of diameter in neodymium-doped $UO_2$ after treatment with the process of the present invention.

DESCRIPTION OF THE PREFERRED EMBODIMENT

The rare-earth (or RE) elements account for about 30% of the fission products and half of the neutron burden in used fuel. Thus, any modification to the dry processing techniques for used fuel that includes removal of a significant fraction of the rare-earth elements would have a major impact on the commercial viability of such a process.

The present invention relates to a process using high temperature treatment under non-reducing conditions which induces an effective segregation from the $U_3O_8$ phase of the RE elements into an RE-rich fluorite-type phase, $(U,RE)O_{2+x}$ (for the sake of simplicity the terms fluorite-type phase and fluorite phase will be used throughout this application to mean samples of $(U,RE)O_{2+x}$ belonging to the same crystal-structure class as fluorite, $CaF_2$). The results of the experiments carried out by the applicant show that not only does RE segregation occur, it appears to occur in such a manner that the smaller particles are enriched in rare-earths. As a result, combined with the differences in densities of $U_3O_8$ and $(U,RE)O_{2+x}$, a simple mechanical separation (e.g., sedimentation, air classification, sieving) can be used to remove a portion of the RE from the $U_3O_8$. By contrast, in the existing AIROX and OREOX processes, samples are not heated to high enough temperatures that a significant degree of RE segregation occurs. Furthermore, in AIROX and OREOX, reduction drives any minute amount of RE which may have segregated back into the single-phase fluorite region so that no net segregation of RE occurs.

Various aspects of the ternary U—RE—O phase diagrams have been studied extensively (Fujino and Miyake 1991, In Handbook on the Physics and Chemistry of the Actinides, Elsevier Science Publishers, New York, Vol. 6, p. 155). Although there are subtle differences among the phase diagrams for the various RE, the general features are the same for most rare earths. The UO—(RE)O—O portion of a typical U—RE—O phase diagram is shown in FIG. 1 for a temperature range from 1000° to 1500° C.

The features of FIG. 1 most important to the dry oxidation of irradiated fuel are:

1. The fluorite field, which occupies a single-phase region (F) consisting of a solid solution of $UO_{2+x}$ and $(RE)O_{1.5}$. This phase typically covers most of the region bounded by $UO_2$, $U_4O_9$, point A and $(RE)O_{1.5}$, except the region labelled "M" (see below).

2. The triangular region bounded by $U_4O_9$, $U_3O_8$ and point A, which is a two-phase region in which the solid-solution fluorite phase and $U_3O_8$ are both present. It has been reported that the solubility of $(RE)O_{1.5}$ in $U_3O_8$ is below the detection limit of the X-ray diffraction (XRD) technique (i.e., below ~0.2 to 0.5 mol. %) (Keller, 1975, Ternäre und polynäre oxide des urans. In Gmelins Handbuch der Anorganischen Chemie, 8 Erganzungswerk, Band 55, Teil C3, Springer-Verlag, Berlin, p. 97).

3. The region labelled "M" in FIG. 1, which is a field in which $(RE)O_{1.5}$ coexists with other RE-rich compounds (e.g., $UO_3.6PrO_{1.5}$ This region is not relevant to the present invention and will not be discussed in any further detail.

OXIDATION BEHAVIOUR OF $UO_2$ AND IRRADIATED FUEL

Oxidation of Unirradiated $UO_2$

The major features of the U—O binary phase diagram are well established. As a sample of pure $UO_2$ is oxidized, its composition moves from the $UO_2$ point on FIG. 1 towards the oxygen apex of the phase diagram. Between $UO_2$ and $U_4O_9$, oxygen anions are incorporated into interstitial vacancies in the fluorite lattice; concomitant changes to the average uranium ion valency occur and the fluorite-type lattice is retained. Only one phase (fluorite) is found in samples in the $UO_2$ to $U_4O_9$ region over the temperature range from 1000° to 1500° C.

If a sample of pure $UO_2$ is oxidized past the $U_4O_9$ point so that the overall O/U ratio lies between 2.25 and 2.67, then two phases, $U_4O_9$ (fluorite) and $U_3O_8$ (orthorhombic) will be present in the sample. Intermediate phases are stable (or metastable) only at relatively low temperatures (e.g., $U_3O_7$) or at high pressures (e.g., $U_2O_5$). The relative amounts of the orthorhombic and fluorite phases in this two-phase region can be calculated by the lever rule.

If further oxygen is added to the system so that the overall composition lies in the range from $U_3O_8$ to O, then $U_3O_8$ will be present along with gas-phase oxygen. Above about 1100° C., $U_3O_8$ loses small quantities of oxygen and above about 1500° C. it decomposes in air to form $UO_{2+x}$ where x is ~0.25.

Oxidation of Irradiated Fuel

The oxidation behaviour of irradiated fuel is more complex than that of unirradiated $UO_2$ because of the numerous fission products found in the irradiated fuel and also because of differences in the fuel microstructure. When estimating the chemical properties of RE in irradiated fuel it is assumed, as a first approximation, that irradiated fuel can be considered as a solid solution of one RE in $UO_2$. The concentration of the single RE is ~1.7 at. %, which is the total quantity of rare earths in a PWR fuel after a fairly typical burnup of 35 MW.d/kg U. The RE content of typical irradiated PWR fuel is given in Table 1.

Throughout this application the terms at. % and mol. % refer to the fraction of the total metal content on an oxygen-free basis; for example, 1.7 at. % RE describes a mixture where the mole fraction RE/[RE+U] is 0.017.

TABLE 1

RARE-EARTH ELEMENT CONTENT OF TYPICAL
IRRADIATED PWR FUEL WITH A BURNUP OF 35 MW ·
d/kg U (from Guenther et al., 1988, Characterization of spent
fuel approved testing material - ATM-106, Pacific Northwest
Laboratory Report, PNL-5109-106.)

| Element | wt. % | at. % |
|---|---|---|
| La | 0.126 | 0.216 |
| Ce | 0.245 | 0.417 |
| Pr | 0.115 | 0.194 |
| Nd | 0.416 | 0.687 |
| Pm | 0.002 | 0.003 |
| Sm | 0.083 | 0.132 |
| Eu | 0.016 | 0.024 |
| Gd | 0.015 | 0.023 |
| Total | 1.019 | 1.696 |

The equilibrium oxidation behaviour of a sample of $UO_2$ doped with 1.7 at. % RE is illustrated in FIG. 2. A stoichiometric solid solution of $UO_2$ and $(RE)O_{1.5}$ will lie along the line joining the points that denote these compounds in FIG. 2. The composition corresponding to 1.7 at. % is point B. Oxidation of such a sample shifts its composition towards the oxygen apex of the phase diagram along line BC. As with $UO_2$, a single fluorite phase is present in this region up to point C. However, if the sample is further oxidized past point C, important differences are observed between $UO_2$ and the RE-doped material. With RE-doped material, sample compositions along the line segment CD consist of two phases, an RE-depleted $U_3O_8$ phase and an RE-enriched fluorite phase. Thus as oxidation proceeds past point C, the composition of the fluorite phase moves along line segment CA as the $U_3O_8$ phase segregates out. When oxidation has proceeded so that the total sample composition is that of point D, the total mixture consists of $U_3O_8$ and a fluorite phase of composition A. The relative amounts of $U_3O_8$ and fluorite phase can again be calculated using the lever rule. The composition of the fluorite phase can be calculated by extrapolating the line OA to the UO—(RE)O axis and determining the relative proportions of RE and U from the position of point E.

In practice, RE-doped $UO_2$ treated with the process of the present invention does not follow this equilibrium pathway exactly, because the rate of oxidation is much faster than the rate of RE segregation. The initial oxidation product is therefore a metastable RE-doped $U_3O_8$ phase. Thus, in the process described below, oxidation and segregation occur in two stages. The final phase assemblage, however, is as described for point D in the preceding paragraph.

Based on the preceding discussion, two parameters in the U—RE—O phase diagram that are of crucial importance to possible application in the process of the present invention was recognized. First, it was implicitly assumed that $U_3O_8$, which segregates in the region $U_4O_9$—A—$U_3O_8$, has a negligible solubility for RE. The bulk of experimental work suggests that RE solubility in $U_3O_8$ is low with typical upper solubility bounds of 0.2 to 0.5 at. %. The second important consideration is the position of point A in the phase diagram (FIGS. 1 and 2). The process of the present invention is directed to the production of a very RE-rich fluorite phase. Such a scenario corresponds to the case where A is located as close as possible to the (RE)O apex of the phase diagram. The exact position of point A varies with both temperature and the elemental identity of RE.

It is estimated that where used fuel is separated into essentially pure $U_3O_8$ and a fluorite phase having the composition $((RE)_{0.35},U_{0.65})O_2$, then the processing of 1.0 kg of irradiated PWR fuel containing 1.7 at. % RE would yield 37 g of a RE-rich fluorite waste. Less than 3% of the uranium in the original kilogram of fuel would be lost in the RE-rich waste material. One important difference between $UO_2$ and irradiated fuel is the presence of significant quantities of plutonium in the irradiated fuel. The similarity in oxidation behaviour of $UO_2$ and mixed-oxide $(U,Pu)O_2$ fuels suggests that plutonium is unlikely to have a dramatic effect on the RE-segregation stage of the process of the present invention. However, its presence is important since any dry processing technique must not readily lend itself to the separation of plutonium from the used fuel, and there must be practical methods for plutonium accounting for safeguards purposes. Retention of most of the plutonium in the processed fuel stream is also economically desirable.

In order to evaluate the feasibility of separating rare earths from uranium oxides, two different types of neodymium-doped $UO_2$ were produced. Neodymium was chosen as a typical rare-earth element since it is the most abundant RE fission product (Table 1). The first set of doped $UO_2$ samples consisted of powders prepared by co-precipitating neodymium and uranium as ammonium diuranate, followed by reduction to $(U,Nd)O_2$. The second set of samples consisted of sintered $UO_2$ pellets; some of these were doped with 2% neodymium, while others were SIMFUEL, i.e., $UO_2$ doped with a mixture of fission products designed to simulate used fuel as disclosed in Lucuta et al. (1991, Micro structural features of SIMFUEL, Journal of Nuclear Materials 178, 48–60.). Most of the tests were performed on the Nd-doped powders and pellets. The degree of segregation of the Nd-rich fluorite phase (from the $U_3O_8$) was determined by X-ray diffraction (XRD). Crude particle-size fractionation tests (by sedimentation and by filtration) were performed on powders oxidized with the process of the present invention, and the Nd content of the various fractions was assayed. It was thus possible to determine whether a simple mechanical separation is likely to remove significant quantities of rare-earth elements from doped $UO_2$.

EXPERIMENTS ON RE-DOPED $UO_2$ POWDERS

Sample Preparation

Samples of $UO_2$ doped with varying quantities (0, 0.1, 0.2, 0.5, 1.0, 2.0 at. %) of RE (where RE was one of Nd, La, Yb or Ce) were prepared by the co-precipitation method disclosed in Clayton and Aronson (1961, Some preparative methods and physical characteristics of Uranium Dioxide Powders, Journal of Chemical and Engineering Data 6,43-51). Most of the experiments on RE-doped powders were performed on samples with RE=Nd. Ammonium hydroxide (25%) was used to co-precipitate neodymium and uranium from a solution of their nitrates. The resulting Nd-doped ammonium diuranate (ADU) was collected by centrifuging, and was washed several times with dilute ammonium hydroxide before being air-dried at 105° C. The ADU powders were then heated in air at 900° C. for 4 h to convert them to $U_3O_8$. The resulting samples were analyzed by XRD, and showed only $U_3O_8$ peaks (mainly α-$U_3O_8$, with up to ~6% β-$U_3O_8$ as determined by the intensity of the XRD peaks). There was no indication of a separate Nd-rich phase, and no correlation between the neodymium content and the relative amounts of α- and β-$U_3O_8$. Shortly before the powders were air oxidized, the doped $U_3O_8$ was reduced to $UO_2$ in Ar/3% $H_2$ for 3 h at 1150° C. XRD analysis of the reduced powders showed only $UO_2$ and, in some cases, small quantities of $U_3O_7$, but no $U_3O_8$ or other impurities.

Air Oxidation Experiments on Nd-Doped $UO_2$ Powders

The doped $UO_2$ samples prepared via the ADU synthetic route were oxidized in flowing air in a Simultaneous Differential Thermal Analysis (DTA)/Thermogravimetric Analysis (TGA) apparatus. The samples were heated from room temperature to ~400° C. at a rate of 10° C./min, and held at that temperature for 16 h. While a temperature of 400° C. was used in this example, the temperature could range between 200° and 600° C. The samples were subsequently heated to 1400° C., again at a rate of 10° C./min, and were held at this temperature for 8 h. A temperature range of 1000° to 1600° C. for this step can be utilized. Peaks associated with the well-known two-step oxidation reaction of $UO_2$ were observed, but there was no indication of any peak associated with the segregation of the RE-rich fluorite phase (FIGS. 3 and 4). However, such a result is not surprising since the segregation process is diffusion-controlled, and the relatively low diffusion rates would give a barely discernible reaction exotherm.

X-ray diffraction analysis of the powders produced by the DTA runs gave convincing evidence that a neodymium-rich fluorite phase segregated from the $U_3O_8$ during the oxidation and heat treatment. FIG. 5 shows the XRD peaks associated with the Nd-rich fluorite phase. The quantitative data discussed below show a correlation between the neodymium content of the original neodymium-doped $UO_2$ and the peak intensity of the fluorite phase in the oxidized powder. The average cell parameter of the fluorite phase in the 1 and 2% Nd-doped material was calculated to be $0.543_4$ nm, which is in good agreement with previously reported values of $\sim 0.543_5$ nm for Nd-doped $UO_2$ sintered in the range from 1200° to 1400° C. (Keller and Boroujerdi, 1972, Journal of Inorganic and Nuclear Chemistry 34, 1187–1193.).

Solubility of Rare Earths in $U_3O_8$

As discussed above, the low solubility of rare earths in $U_3O_8$ is one of the key factors in the process of the present invention. Thus, the oxidation products of the doped $UO_2$ powder were analyzed quantitatively by XRD to determine the solubility of neodymium in $U_3O_8$ at 1400° C. In such a quantitative analysis, the integrated area of the doublet at ~26.0° was used as a measure of the intensity ($I_{U3O8}$) of the $U_3O_8$ signal, and the area of the peak at ~28.4° for the intensity ($I_{fluorite}$) of the fluorite-phase signal. The quantity of fluorite phase present in a sample was considered to be proportional to the ratio $F=I_{fluorite}/(I_{fluorite}+I_{U3O8})$. While such an approximation is crude since it assumes equal absorption coefficients for $U_3O_8$ and the fluorite phase, it will affect the slope of the graph of F as a function of neodymium content at low neodymium concentrations (FIG. 6), but will only have a minor effect on the measured neodymium solubility, i.e., the x-intercept. The ratio F was calculated for each of the samples and the results are shown in Table 2. The data in Table 2 are plotted in FIG. 6; from this figure the solubility of neodymium in $U_3O_8$ at 1400° C. is estimated to be less than 0.3 at. %.

Air Oxidation Experiments and Solubility of Rare Earths in $U_3O_8$ where RE=Ce, La or Yb The air oxidation experiments and solubility tests described above in respect of neodymium doped samples were conducted in the same manner where RE=Ce, La or Yb. The results are summarized in Tables 3, 4 and 5. The data in tables 3, 4 and 5 are plotted respectively in FIGS. 7, 8 and 9. From these Figures, the solubility of cerium, lanthanum and ytterbium in $U_3O_8$ at 1400° C. is estimated to be 0.3 at. % or less.

TABLE 2

RATIO $F = I_{fluorite}/(I_{fluorite} + I_{U3O8})$ IN THE PRODUCT OBTAINED BY TREATING $UO_2$ POWDER (DOPED WITH VARYING AMOUNTS OF NEODYMIUM) WITH A TWO-STAGE AIR OXIDATION (400° C., 16 h) AND HEAT TREATMENT (1400° C., 8 h)

| % Neodymium in $UO_2$ | F |
| --- | --- |
| 0.00 | 0.0000 |
| 0.27 | 0.0075 |
| 0.53 | 0.0318 |

TABLE 2-continued

RATIO $F = I_{fluorite}/(I_{fluorite} + I_{U3O8})$ IN THE PRODUCT OBTAINED BY TREATING $UO_2$ POWDER (DOPED WITH VARYING AMOUNTS OF NEODYMIUM) WITH A TWO-STAGE AIR OXIDATION (400° C., 16 h) AND HEAT TREATMENT (1400° C., 8 h)

| % Neodymium in $UO_2$ | F |
| --- | --- |
| 0.80 | 0.0454 |
| 1.06 | 0.0588 |
| 1.33 | 0.0836 |

TABLE 3

RATIO $F = I_{fluorite}/(I_{fluorite} + I_{U3O8})$ IN THE PRODUCT OBTAINED BY TREATING $UO_2$ POWDER (DOPED WITH VARYING AMOUNTS OF CERIUM) WITH A TWO-STAGE AIR OXIDATION (400° C., 16 h) AND HEAT TREATMENT (1400° C., 8 h)

| % Cerium in $UO_2$ | Ratio F |
| --- | --- |
| 0.00 | 0.0000 |
| 0.25 | 0.0000 |
| 0.50 | 0.0065 |
| 0.74 | 0.0325 |
| 0.99 | 0.0404 |
| 1.24 | 0.0494 |
| 1.86 | 0.0866 |

TABLE 4

RATIO $F = I_{fluorite}/(I_{fluorite} + I_{U3O8})$ IN THE PRODUCT OBTAINED BY TREATING $UO_2$ POWDER (DOPED WITH VARYING AMOUNTS OF LANTHANUM) WITH A TWO-STAGE AIR OXIDATION (400° C., 16 h) AND HEAT TREATMENT (1400° C., 8 h)

| % Lanthanum in $UO_2$ | Ratio F |
| --- | --- |
| 0.00 | 0.0000 |
| 0.23 | 0.0271 |
| 0.46 | 0.0467 |
| 0.69 | 0.0651 |
| 0.92 | 0.0797 |
| 1.15 | 0.1100 |
| 1.73 | 0.1449 |

TABLE 5

RATIO $F = I_{fluorite}/(I_{fluorite} + I_{U3O8})$ IN THE PRODUCT OBTAINED BY TREATING $UO_2$ POWDER (DOPED WITH VARYING AMOUNTS OF YTTERBIUM) WITH A TWO-STAGE AIR OXIDATION (400° C., 16 h) AND HEAT TREATMENT (1400° C., 8 h)

| % Ytterbium in $UO_2$ | Ratio F |
| --- | --- |
| 0.00 | 0.0000 |
| 0.25 | 0.0054 |
| 0.50 | 0.0157 |
| 0.74 | 0.0352 |
| 0.99 | 0.0456 |
| 1.24 | 0.0477 |
| 1.86 | 0.0781 |

EXPERIMENTS ON SINTERED PELLETS

Sample Preparation

Oxidation experiments were also performed on sintered pellets of $UO_2$ doped with 2 at. % neodymium, which were obtained from J. Sullivan (Fuel Materials Branch, Chalk River Laboratories). The sintered pellets were obtained by mixing finely divided oxide powders in the appropriate amounts, and then sintering in a hydrogen atmosphere. A slice of one of the Nd-doped $UO_2$ pellets was polished to a 0.05-μm finish and examined by scanning electron microscopy/energy dispersive X-ray spectrometry. This examination did not reveal any evidence of neodymium segregation, and it was thus concluded that the sintering process was successful in forming a solid solution between the neodymium and uranium in $(U,Nd)O_{2+x}$.

Tests were also performed on a sample of simulated high-burnup nuclear fuel (i.e., SIMFUEL). The 4 at. % simulated-burnup material used was prepared at Chalk River Laboratories by mixing the appropriate powdered materials and sintering as described in earlier published accounts (Lucuta et al. 1991, supra, Journal of Nuclear Materials 178, 48–60.).

Oxidation Experiments on Nd-Doped $UO_2$ Pellets

Four specimens of Nd-doped $UO_2$, cut from a sintered pellet, were oxidized at 400° C. (16 h) to $U_3O_8$, and were then individually heated in air for ~16 h at 750°, 1000°, 1250°, and 1380° C. XRD analysis of the resulting powders revealed only $U_3O_8$ in the samples subjected to the 750° and 1000° C. heat treatments. However, a fluorite phase had segregated from the $U_3O_8$ in the course of treatments at both 1250 and 1380° C. (FIG. 10). The intensity of the XRD peaks associated with the Nd-rich fluorite phase (relative to the $U_3O_8$ peaks) is approximately the same in those produced by oxidizing the 2 at. % Nd-doped $UO_2$ pellet as the 2 at. % Nd-doped $UO_2$ powders (compare FIGS. 5 and 10). The lattice parameter of the fluorite phase was $0.5437_0$ nm in the samples oxidized at 1250° C., and $0.5433_2$ nm for those oxidized at 1380° C.

Oxidation Experiments on SIMFUEL

One test was done on a 4% SIMFUEL sample. A fragment of a disc cut from the sintered pellet was powdered by oxidizing it in air at 400° C. for 4 h, and then heated to 1200° C. in air for a further 16 h. The XRD pattern given in FIG. 11 shows clearly the presence of a significant quantity of fluorite phase, indicating that segregation of the RE has occurred. Such a result is important since it suggests that the numerous nonvolatile fission products present in a sample of used fuel do not have a dramatic effect on the U—RE—O phase relationships. The lattice parameter calculated for the fluorite phase that segregated from the SIMFUEL sample was $0.5428_3$ nm, which is consistent with published results for doped $UO_2$ (Keller and Boroujerdi, 1972, Journal Inorganic and Nuclear Chemistry 34, 1187–1193).

EXPERIMENTS ON USED PWR FUEL

Experimental

The process of the present invention was applied to samples of used PWR fuel in a series of tests performed at Chalk River Laboratories, with subsequent product analysis at Whiteshell Laboratories. Samples of used PWR fuel were from H. B. Robinson Unit 2. The burnup was 672 MWh/kg U.

Examination by SEM revealed that segregation of a RE-rich phase occurred when the used fuel was treated according to the present invention. Detailed analysis was performed on one sample of H. B. Robinson fuel, which was oxidized 4.5 h at 440° C. and subsequently heated (4 h at 1400° C.). Examination by SEM revealed the presence of RE-rich nodules, while XRD patterns displayed significant peaks associated with the fluorite-type phase (FIG. 12). Detailed examination of the RE-rich nodules by wavelength-dispersive x-ray emission (WDX) revealed the presence of significant quantities of each of the major RE fission products (Nd, Ce, La, Pr and Sm) in used PWR fuel. Similar examination of the $U_3O_8$ grains did not display any significant amount of rare earths (FIG. 13).

PARTICLE SIZE OF THE PRODUCT AND RARE-EARTH SEGREGATION

Characterization of the Particle-Size Distribution

Scanning electron microscopy (SEM) examination of the powders produced by oxidizing Nd-doped sintered pellets at 400° C., then heating to 1250° C., revealed the presence of many large (~10 μm), well-faceted $U_3O_8$ crystals (FIG. 14). In addition, there were numerous small (~1 μm) particles, which in some cases adhered to the side of the larger $U_3O_8$ grains. This microstructure contrasts with materials heated at 750° C. or 1000° C. in the second stage of the process of the present invention. Samples treated at these lower temperatures display the irregular "popcorn" morphology characteristic of $U_3O_8$ formed by low-temperature oxidation of $UO_2$ (FIG. 15). This indicates that solid-state recrystallization of $U_3O_8$ occurred at 1250° C. but not at or below 1000° C., and suggests that secondary crystallization of the RE-rich fluorite phase occurred concurrently with this recrystallization. Examination of the $U_3O_8$ grains and the smaller RE-rich fluorite phase by energy-dispersive X-ray emission (EDX) consistently displayed significant quantities of neodymium in the latter, but not in the former.

A set of samples treated by the process of the present invention was analyzed for particle-size distribution by slurrying a small quantity of the product in 100 ml of water and using a Climet Particle Counter. The measured particle size distribution (FIG. 16) confirms that there are two groups of particle sizes observed in these powders, one group approximately 10 to 20 μm in diameter and the other less than 5 μm in diameter. A simple test was therefore used to check the feasibility of separating some of the RE by a particle-size-based process.

Rare-Earth Separation Tests

A small quantity (~0.25 g) of the 2 at. % Nd-doped $U_3O_8$ treated by the process of the present invention at 1250° C. was slurried in 75 cm³ of distilled water, followed by ultrasonic dispersion for 2 min to dislodge any small Nd-rich particles that may have been weakly attached to the larger $U_3O_8$ grains. A very small quantity of ultrafine particulate was noticed floating on the surface of the water; this material was decanted and filtered through a 0.8-μm nylon filter. The remaining mixture was then stirred vigorously, and the coarse particles were allowed to settle for 40 s. The finer particulate, still suspended at this time, was filtered through a 0.8-μm nylon filter. Finally, the remaining "coarse" fraction was removed from the water by filtration. All three size fractions (coarse, fine, ultrafine) were washed with isopropanol and air-dried. The various size fractions were analyzed by inductively coupled plasma (ICP) spectrophotometry for the Nd/U ratio, and the results (Table 6) show that a significant concentration of Nd in the finer particle fractions was achieved. However, it should be noted that only a very small percentage of the starting material was present in the fine and ultrafine fractions.

TABLE 6

NEODYMIUM:URANIUM MOLE RATIO IN COARSE,
FINE, AND ULTRAFINE SIZE FRACTIONS SEPARATED
BY SEDIMENTATION FROM A POWDER OBTAINED BY
TREATING A 2 at. % Nd-DOPED $UO_2$ PELLET WITH THE
PROCESS OF THE PRESENT INVENTION AT 1250° C.

| Sample | Nd/U (atom ratio) |
| --- | --- |
| Coarse | 0.0176 |
| Fine | 0.0571 |
| Ultrafine | 0.0448 |

In a second test, a disk from an Nd-doped sintered pellet was treated by the process of the present invention by heating at 400° C. for 16 h and then 1250° C. for 16 h. A small quantity (0.26 g) of the material was slurried in 100 ml of water, and the mixture was filtered through an 8-μm millipore filter. The filtered particulate was washed several times with distilled water, and the solid sample was saved. The filtration process was then repeated by filtering the remaining solution through 5-, 1.2- and 0.22-μm filters sequentially. The resulting powders were then assayed by ICP spectrophotometry for neodymium and uranium content. The results are given in Table 7. Although the total amounts of material in the finer fractions were very low, it is apparent that significant neodymium enrichment has occurred in the 1.2-μm fraction.

TABLE 7

URANIUM AND NEODYMIUM CONTENT OF THE 0.22-,
1.2-, 5- AND 8-μm SIZE FRACTION AFTER TREATMENT
BY THE PROCESS OF THE PRESENT INVENTION

| Sample | Uranium (μg) | Neodymium (μm) | Neodymium (at. %) |
| --- | --- | --- | --- |
| 0.22 μm | 16.3 | <2.0* | — |
| 1.2 μm | 23.0 | 3.5 | 20.1 |
| 5 μm | 3 140 | 37.5 | 1.94 |
| 8 μm | 196 000 | 2330 | 1.93 |

*The neodymium content of the 0.22-μm sample was not detectable because of the very small sample mass.

CONCLUSIONS

Examination of the ternary U—RE—O phase diagram has shown that air oxidation of RE-doped $UO_2$ (or irradiated fuel), followed by treatment at temperatures from 1000° to 1600° C. results in the formation of an RE-rich fluorite phase and $U_3O_8$. Although there are significant differences between the various rare-earth elements, the RE content of the fluorite phase should be approximately 25 to 40 mol. %, while that of the $U_3O_8$ phase should be quite low (less than or equal to approximately 0.3 at. % at the temperatures used in our process).

Experimental results using $UO_2$ doped with neodymium (taken as a typical RE) have shown that such a segregation does in fact occur. Typical experiments were done in two stages:

1. a low-temperature oxidation (400° to 600° C.) to convert the $UO_2$ to $U_3O_8$ powder, and
2. a high-temperature treatment (1250° to 1400° C.) to cause segregation of the rare-earth elements into the fluorite phase.

The use of the process of the present invention showed good segregation of the Nd-rich fluorite phase for both sintered pellets and $UO_2$ powder prepared by the ammonium diuranate (co-precipitation) method. A further test using SIMFUEL also showed RE segregation. Application of the process of the present invention to used PWR fuel confirmed that such treatment results in the formation of a fluorite-type phase, and that a significant quantity of each of the major RE fission products is found in this phase.

Sedimentation and filtration experiments have shown that the RE-rich fluorite phase has a significantly smaller particle-size distribution than the $U_3O_8$. Thus, significant quantities of the RE-rich material can be removed by a mechanical separation such as sieving, air classification or sedimentation, by volatilization, or by absorption into an inert phase such as $Al_2O_3$, $ZrO_2$ or $SiO_2$, which is capable of absorbing rare earths. Removal of RE may be enhanced by post-segregation sample treatment by attrition, sample reduction (to convert the $U_3O_8$ back to $UO_2$), or other methods which reduce the fraction of RE-rich nodules which adhere to the larger $U_3O_8$ grains.

The invention is not limited to the rare earths exemplified in the disclosure and has equal application to the removal of any rare earths from spent nuclear fuel.

While the present invention has been described in connection with a specific embodiment thereof and in a specific use, various modifications will occur to those skilled in the art without departing from the spirit and scope of the invention as set forth in the appended claims. The terms and expressions used in the specification are used as terms of description and not of limitation and there is no intention that the use of such terms and expressions exclude equivalents of the features shown and described. It is recognized that various modifications are possible within the scope of the invention claimed. We therefore wish to embody within the scope of the patent which may be granted hereon all such embodiments as reasonably and properly come within the scope of our contribution to the art. In particular, the present process can be used with a variety of spent nuclear fuels including spent nuclear fuel from light water reactors, heavy water reactors and fast breeder reactors.

All citations to references in the present specification are incorporated herein by reference.

The embodiments of the invention in which an exclusive property or privilege is claimed are as follows:

1. A method of removing rare earths from spent nuclear fuel comprising the steps of:
   oxidizing said spent nuclear fuel at a temperature of between about 200° C. to about 800° C. thereby oxidizing $UO_2$ to $U_3O_8$;
   heating said spent nuclear fuel at a temperature of between about 1000° to about 1600° C. thereby causing $U_3O_8$ to segregate into a RE-rich fluorite phase and an RE-poor $U_3O_8$ phase;
   separating the RE-rich fluorite phase.

2. The method of claim 1 wherein the rare earths are selected from the group consisting of neodymium, samarium, cerium, lanthanum, praseodymium and ytterbium.

3. The method of claim 2 wherein the rare earths are selected from the group consisting of neodymium, cerium, lanthanum and ytterbium.

4. The method of the claim 1 wherein the oxidation of the spent nuclear fuel is carried out in the presence of an oxidant selected from the group consisting of, air, oxygen, $N_2O$, NO and $NO_2$.

5. The method of claim 1 wherein the spent nuclear fuel is oxidized at a temperature of between about 400° to 600° C.

6. The process of claim 1 wherein the spent nuclear fuel is heated at a temperature of between about 1250° to 1500° C.

7. The process of claim 1 wherein the RE-rich fluorite phase is separated by sieving, air classification, electrostatic or magnetic separation, sedimentation, volatilization or by absorption into an inert matrix.

8. The process of claim 1 comprising the following additional steps:

reducing the remaining RE-poor $U_3O_8$ phase to a RE-poor $UO_2$ phase;

sintering the RE-poor $UO_2$ phase into fuel pellets.

9. The process of claim 8 wherein the RE-poor $U_3O_8$ phase is reduced by a gas phase reductant.

10. The process of claim 9 wherein the gas phase reductant is selected from the group consisting of $H_2$ and CO.

* * * * *